United States Patent
Joe

(10) Patent No.: US 7,278,735 B2
(45) Date of Patent: Oct. 9, 2007

(54) SINGLE FOCUS COMPOUND LENS AND MOLD

(76) Inventor: Hyun-Soo Joe, 235-12 Jincheon-Dong, Dalseo-Gu, Taegu (KR)

( * ) Notice: Subject to any disclaimer, the term of this patent is extended or adjusted under 35 U.S.C. 154(b) by 0 days.

(21) Appl. No.: 10/545,451

(22) PCT Filed: Nov. 7, 2003

(86) PCT No.: PCT/KR04/02401

§ 371 (c)(1),
(2), (4) Date: Aug. 12, 2005

(87) PCT Pub. No.: WO2004/083939

PCT Pub. Date: Sep. 30, 2004

(65) Prior Publication Data

US 2006/0073231 A1   Apr. 6, 2006

(30) Foreign Application Priority Data

Mar. 20, 2003  (KR) .................... 10-2003-0017475

(51) Int. Cl.
  G02C 7/02   (2006.01)
  G02C 7/06   (2006.01)
(52) U.S. Cl. .................... 351/159; 351/172; 351/168; 351/178
(58) Field of Classification Search ................ 351/159, 351/172
  See application file for complete search history.

(56) References Cited

U.S. PATENT DOCUMENTS 5,142,411 A * 8/1992 Fiala ........................ 359/494
5,470,892 A * 11/1995 Gupta et al. .................. 522/42
6,309,067 B1 * 10/2001 Zeidler ....................... 351/159

FOREIGN PATENT DOCUMENTS

| JP | 11337886 | 12/1999 |
| JP | U3065867 | 2/2000 |
| JP | 2002-202481 | 7/2002 |

OTHER PUBLICATIONS

English Translation of Hoshino JP Application 2002-202481 Published Jul. 19, 2002.*

* cited by examiner

Primary Examiner—Jessica T Stultz
(74) Attorney, Agent, or Firm—IPLA P.A.; James E. Bame

(57) ABSTRACT

Disclosed is a single focus compound lens and a mold for manufacturing the single focus compound lens, where the single focus compound lens has a reading far point diopter lens and a reading near point diopter having different diopters that are integrally molded to have the same optical central point and the mold has the two divided areas with respect to the optical central point, each of the two areas forming an inner peripheral surface having a difference in curvature and thickness corresponding to the diopter difference, such that near distance works like reading or doing with a computer can be accomplished without any trouble and the fatigue of eyes caused due to the failure of correspondence of focuses can be prevented.

3 Claims, 2 Drawing Sheets

SINGLE FOCUS COMPOUND LENS AND MOLD

TECHNICAL FIELD

The present invention relates to a single focus compound lens and a mold for manufacturing the same, and more particularly, to a single focus compound lens that makes the focal point of the area for viewing a relatively longer distance and the focal point of the area for viewing a relatively shorter distance at a short distance correspond to each other, such that the fatigue of eyes caused when the focal points differ can be prevented, and to a mold for manufacturing a single focus compound lens.

BACKGROUND ART

As well known, a glass lens has been used for curing people of various types of abnormal visual acuities like hyperopia, myopia, presbyopia, and so on which are generally caused by the troubles with the lens of an eyeball. In some cases, especially, there is a need for the lens having one or more diopters, and to satisfy the need, is provided multiple focal lens like double focal lens.

For example, as people get older, they suffer from both of the myopia and presbyopia. Therefore, they should have both of the glasses for curing their myopia and the glasses for curing their presbyopia. To eliminate such their inconveniences, there has been developed double focal lens that is made in such a manner as to permit a user to view both of the short and long distances.

The double focal lens is configured in such a manner that two kinds of lenses for uses of long distance and short distance having different refractive indexes are formed of a single lens so as to clearly observe the objects at different distances, so that a user can observe the objects at close distances, without changing his or her glasses, even at the state of clearly viewing the objects at long distances.

The multiple focal lens including the double focal lens first cures a lens's distance portion and then determines reading addition according to the distance lens, thereby inserting the reading lens into the distance lens. In general, the multiple focal lens has the optical central points of the reading and distance portions that are spaced by the left and right length of 2 mm and the height of 10 mm. This is because eyes are converged on a nose and the observing angle from the long distance to the short distance are different when the lens is moved from the distance portion to the reading portion.

On the other hand, a mold for manufacturing the multiple focal lens and the double focal lens is provided with upper and lower support plates 1 and 2 each of which having a single focus and curvature for curing a single distance at the inner peripheral surface thereof, as shown in FIG. 1.

A reference numeral 3, which is not explained in the drawing, denotes a pressure rubber plate.

A conventional double focal lens is manufactured in such a fashion that the distance lens and the reading lens that are separately made by the above-mentioned mold are coupled to provide two optical central points, that is, a distance lens focus and a reading lens focus on the single lens. This causes the manufacturing costs to become undesirably high.

Contrarily, in case where a user reads or works with a computer, he or she reads at a relatively close distance but watches the monitor at a relatively long distance. In this case, the two distances are somewhat different. At this time, if he or she is wearing generally reading glasses having a single diopter, he or she cannot view very well the monitor at a longer distance than the book, such that he or she feels his or her eyes get tired and also his or her posture becomes poor.

Therefore, there is a need for improvement of the single reading lens of clearly viewing all of the near point objects and the far point objects. In case of the conventional multiple focal lens from the viewpoint of applying the need for the improvement, however, it has provided the following problem:

If the optical central points are different, the objects at the respective focuses look positioned differently, and the phases of the objects look scattered by the positions of the optical central points when the observing directions are moved shortly in upward and downward directions while seeing short distances within the same distance.

DISCLOSURE OF INVENTION

Accordingly, the present invention has been made to solve the above-described problems, and it is an object of the present invention to provide a single focus compound lens that is capable of clearly observing objects that are disposed at substantially different distances while a user does something at a relatively near distance like reading or working with a computer, such that the fatigue of the eyes is prevented.

It is another object of the present invention to provide a mold for manufacturing a single focus compound lens in large quantities.

According to one aspect of the present invention, there is provided a single focus compound lens that includes a reading far point diopter lens and a reading near point diopter lens having a diopter difference in a range between 0.3 diopter and 1 diopter therebetween, the reading far point diopter lens and the reading near point diopter lens being integrally molded in such a manner that their focal points correspond to each other.

Preferably, the diopter difference between the reading far point diopter lens and the reading near point diopter lens is 0.5 diopter, and it compensates for a difference in curvature and thickness with respect to their focal points.

According to another aspect of the present invention, there is provided a mold for manufacturing a single focus compound lens having two areas divided with respect to a single optical central point, each of the areas having different diopters, each of the two areas forming the inner peripheral surfaces each having the difference in curvature and thickness corresponding to the diopter difference.

In this configuration, the mold is provided with a support plate forming the inner face of the lens (which is referred to as 'upper support plate') and another support plate forming the outer face of the lens (which is referred to as 'lower support plate') so as to have a difference in curvature and thickness corresponding to the diopter difference between the two lenses divided with respect to the optical central point, in such a manner that any one of the upper and lower support plates that is arbitrary selected forms the inner peripheral surface having the difference in curvature and thickness corresponding to the diopter difference, or both of the upper and lower support plates form the inner peripheral surfaces each having a difference in curvature and thickness, such that the differences in curvature and thickness between the upper and lower support plates are added to become the difference in curvature and thickness corresponding to the diopter difference.

In case of the reading lens, it is possible to correspond to the optical central point because there is no almost difference between the distances according to convergence and the observing angle, for example, within a distance in a range between 35 cm and 45 cm.

BRIEF DESCRIPTION OF THE DRAWINGS

Further objects and advantages of the invention can be more fully understood from the following detailed description taken in conjunction with the accompanying drawings, in which.

BEST MODE FOR CARRYING OUT THE INVENTION

Now, an explanation of the preferred embodiment of the present invention will be given.

Figure 1:
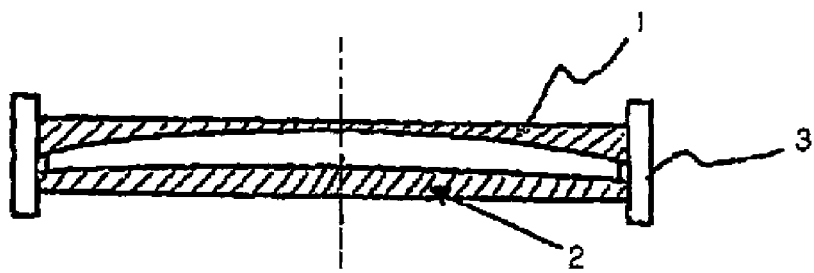
FIG. 1 is a sectional view showing a mold for double focal lens in conventional practices.
Figure 2A:
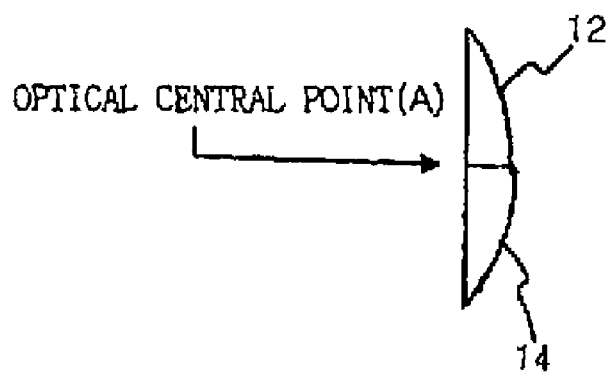
FIG. 2a is a side view of a single focus compound lens according to the present invention.
Figure 2B:
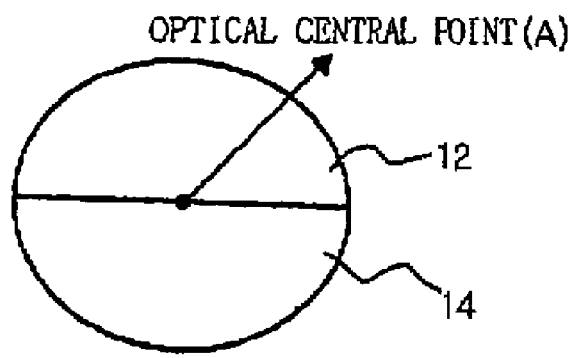
FIG. 2b is a front view of the single focus compound lens of this invention.

FIG. 2a is a side view of a single focus compound lens according to the present invention, and FIG. 2b is a front view of the single focus compound lens.

As shown in FIGS. 2a and 2b, the single focus compound lens according to the present invention has a diopter difference by making the upper and lower portions thereof different in their curvature and thickness with respect to a single optical central point A, wherein the upper portion becomes a reading far point diopter lens 12 and the lower portion becomes a reading near point diopter lens 14, their focuses corresponding to the single optical central point A.

Preferably, the diopter difference between the reading far point diopter lens 12 and the reading near point diopter lens 14 is 0.5 diopter, as shown in Table 1.

TABLE 1

| Reading near point diopters | Reading far point diopters |
| --- | --- |
| 1.00 | 0.50 |
| 1.25 | 0.75 |
| 1.50 | 1.00 |
| 1.75 | 1.25 |
| 2.00 | 1.50 |
| 2.25 | 1.75 |
| 2.50 | 2.00 |
| 2.75 | 2.25 |

Table 1 shows the references of the reading far point diopters according to the reading near point diopters. The reading near point diopters indicate the addition applied to the reading distance (30 to 40 cm) measured generally, and the reading far point diopters indicate the addition applied to the distance (40 to 50 cm) away from the reading near point diopters. The difference between the reading near point diopters and the reading far point diopters is 0.5 diopter.

Figure 3:
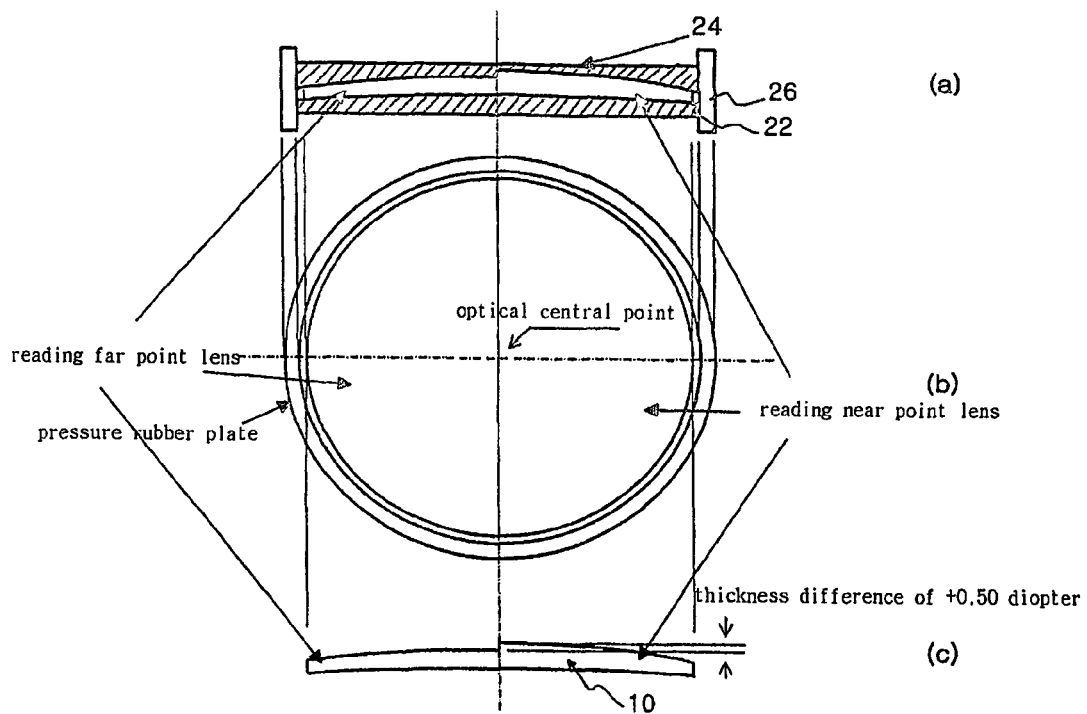
FIGS. 3a to 3c are views of a configuration of mold for the single focus compound lens of this invention and the shape of the lens.

FIGS. 3a to 3c are views of a configuration of a mold for the single focus compound lens of this invention and the shape of the lens, wherein FIG. 3a is a sectional view of the mold, FIG. 3b is a plan view of the mold, and FIG. 3c is a side view of the lens made by the mold.

As shown in FIGS. 3a and 3b, the mold for the single focus compound lens is provided with a lower support plate 22 that has generally equal curvature on its inner peripheral surface and with an upper support plate 24 that has a difference in curvature and thickness between the two divided parts with respect to the optical central point A on its inner peripheral surface, wherein the difference in curvature and thickness corresponds to the diopter difference (which is 0.5 diopter in the preferred embodiment of the present invention).

A reference numeral 26, which is not explained in the drawing, denotes a pressure rubber plate.

If the lens is molded by using the upper and lower support plates 22 and 24, the reading near point lens and the reading far point lens form the same optical central point A as shown in FIG. 3c and have the difference in curvature and thickness corresponding to the difference of 0.5 diopter, thereby completing the molding of the single-focal compound lens 10.

Such the single focus compound lens 10 is usually applicable when a user views the documents in front of himself or herself, while viewing the monitor of a computer, when views the objects at different distances, for example, during a card game, when it is necessary to observe reading near points, for example, during working with care like an assembling work, when cooking, or when he or she does something having reading near points and reading far points differently positioned from one another.

The single focus compound lens has the diopter difference between the both sides with respect to the optical central point A, but it has the single optical central point A, such that the phases of objects are not scattered and the fatigue of eyes is greatly reduced.

On the other hand, the single focus compound lens according to the present invention can be varied in thickness in accordance with molding materials and methods.

INDUSTRIAL APPLICABILITY

As set forth in the foregoing, there is provided a single focus compound lens according to the present invention has a single optical central point even though it has the two lenses having different diopters, such that the phases of objects are not scattered and the fatigue of eyes is greatly reduced.

In addition, the conventional multiple focal lens first cures a lens's distance portion and then determines reading addition according to the distance lens, thereby adding the reading lens to the distance lens. So, it is impossible to manufacture such the conventional multiple focal lens in great quantities. However, the single focus compound lens of this invention is manufactured by using the mold of this invention, which can be made by the diopter units in great quantities.

Furthermore, since general reading glasses have a single focus, it makes the user's eyes feel tired if he or she views a longer distance than the focus, but since the single focus compound lens of this invention has the same focus on reading and distance lenses, it makes the user's eyes feel comfortable if he or she views the near and far distances.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A single focus compound lens comprising a reading far point diopter lens and a reading near point diopter lens having a diopter difference, each comprising an inner surface and an outer surface, wherein the inner surfaces of the reading far point diopter lens and the reading near point diopter lens have an equal curvature, wherein the diopter difference between the reading far point diopter lens and the reading near point diopter lens compensates for a difference in curvature of the outer surfaces and thickness between the two lenses with respect to a single focus, and wherein the reading far point diopter lens and the reading near point diopter lens comprise a same optical central point.

2. A single focus compound lens according to claim 1, wherein the diopter difference is in a range between 0.3 diopter and 1 diopter therebetween, the reading far point diopter lens and the reading near point diopter lens being integrally molded in such a manner that their focuses correspond to each other.

3. A single focus compound lens according to 2, wherein the diopter difference between the reading far point diopter lens and the reading near point diopter lens is 0.5 diopter.

* * * * *